US010895991B2

(12) United States Patent
Saxena et al.

(10) Patent No.: US 10,895,991 B2
(45) Date of Patent: Jan. 19, 2021

(54) SOLID STATE DEVICE WITH IMPROVED SUSTAINED DATA WRITING SPEED

(71) Applicant: Western Digital Technologies, Inc., San Jose, CA (US)

(72) Inventors: Vishwas Saxena, Bangalore (IN); Abhijit K. Rao, Bangalore (IN); Saifullah Mohiddin Nalatwad, Bangalore (IN); Sameer Hiware, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 143 days.

(21) Appl. No.: 16/191,193

(22) Filed: Nov. 14, 2018

(65) Prior Publication Data

US 2020/0150873 A1    May 14, 2020

(51) Int. Cl.
*G06F 12/10* (2016.01)
*G06F 3/06* (2006.01)
*G06F 12/02* (2006.01)

(52) U.S. Cl.
CPC .......... *G06F 3/0613* (2013.01); *G06F 3/0631* (2013.01); *G06F 3/0644* (2013.01); *G06F 3/0659* (2013.01); *G06F 3/0679* (2013.01); *G06F 12/0246* (2013.01); *G06F 2212/1024* (2013.01); *G06F 2212/171* (2013.01); *G06F 2212/214* (2013.01); *G06F 2212/7202* (2013.01)

(58) Field of Classification Search
CPC ........................... G06F 12/0246; G06F 3/0613
USPC .......................................................... 711/103
See application file for complete search history.

(56) References Cited

U.S. PATENT DOCUMENTS

| 2008/0126680 | A1* | 5/2008 | Lee | .......................... | G06F 3/064 711/103 |
| 2016/0110126 | A1* | 4/2016 | Lee | ..................... | G11C 11/5628 711/103 |

* cited by examiner

*Primary Examiner* — Jae U Yu
(74) *Attorney, Agent, or Firm* — Loza & Loza, LLP; Gabriel Fitch

(57) ABSTRACT

Aspects of the disclosure provide a data storage apparatus that includes a non-volatile memory (NVM) and a controller. The NVM includes a first NVM portion and a second NVM portion. The first NVM portion includes a plurality of first cell types. The first NVM portion includes a first sub-portion that is allocated to store file management data. The second NVM portion includes a plurality of second cell types. The controller is coupled to the NVM. The controller is configured to receive a plurality of payload data and a plurality of file management data; store the plurality of file management data at the first sub-portion of the first NVM portion; and store the plurality of payload data at the NVM.

20 Claims, 12 Drawing Sheets

SOLID STATE DEVICE WITH IMPROVED SUSTAINED DATA WRITING SPEED

FIELD

The present invention relates to solid state devices (SSDs), and more particularly to a solid state device (SSD) that includes improved sustained data writing speed.

INTRODUCTION

In a variety of consumer electronics, solid state devices (SSDs) incorporating non-volatile memories (NVMs) are frequently replacing or supplementing conventional rotating hard disk drives for mass storage. These non-volatile memories may include one or more flash memory devices, such as NAND flash memories. These SSDs provide better performance than conventional rotating hard disk drives.

While SSDs provide very fast writing speeds relative to hard disk drives, there is ongoing need to improve the sustained writing speeds of SSDs. One example where writing speed is important is when a host records video data. Hosts, such as digital video cameras, are capable of capturing high density and high-quality videos. Recording high density videos creates a lot of data that has to be stored. Thus, SSDs must have writing speeds that can keep up with the speed at which data is created when the host is recording high density videos, such as 4K video. Otherwise, data that is created by the host, may be lost and not get stored at the SSD. While SSDs can be fabricated with memory cells that have very fast writing speeds, SSDs are not optimized to take full advantage of the maximum writing speeds of these memory cells. These SSDs are often slowed down by the need to perform garbage collection during a writing operation at the SSDs, which reduces the effective writing speed of the SSDs.

An improved SSD is proposed that provides improved sustained maximum writing speeds. Such an improved SSD may be implemented as a memory card that can be used to support real time recording and storing of high density and high-quality videos.

SUMMARY

According to an aspect, a data storage apparatus includes a non-volatile memory (NVM) and a controller. The NVM includes a first NVM portion and a second NVM portion. The first NVM portion includes a plurality of first cell types. The first NVM portion includes a first sub-portion that is allocated to store file management data. The second NVM portion includes a plurality of second cell types. The controller is coupled to the NVM. The controller is configured to receive a plurality of payload data and a plurality of file management data; store the plurality of file management data at the first sub-portion of the first NVM portion; and store the plurality of payload data at the NVM.

According to another aspect, a method for operating a data storage apparatus, is described. The method receives data, at a controller coupled to a non-volatile memory (NVM). The NVM includes a plurality of first cell types and a plurality of second cell types. The plurality of first cell types includes a first plurality of addresses allocated to store only file management data; and a second plurality of addresses allocated to store only payload data. The plurality of second cell types includes a third plurality of addresses. The method determines whether the received data includes payload data or file management data. The method stores the received data at one or more addresses from the first plurality of addresses, when the received data includes file management data. The method stores the received data at one or more addresses from the second plurality of addresses, when the received data includes payload data.

According to another aspect, a data storage apparatus includes means for non-volatile storing of data, and means for controlling the means for non-volatile storing of data. The means for non-volatile storing of data includes means for first non-volatile storing of data and means for second non-volatile storing of data. The means for first non-volatile storing of data includes a first plurality of addresses allocated to store file management data; and a second plurality of addresses allocated to store payload data. The means for second non-volatile storing of data, includes a third plurality of addresses. The means for controlling the means for non-volatile storing of data includes: means for receiving data; means for determining whether the received data includes payload data or file management data; means for storing the received data at one or more addresses from the first plurality of addresses, when the received data includes file management data; and means for storing the received data at one or more addresses from the second plurality of addresses, when the received data includes payload data.

DETAILED DESCRIPTION

The present disclosure provides a data storage device/apparatus. The data storage device/apparatus may be a solid state device (SSD). In one aspect, the SSD may be a memory card. A data storage apparatus, such as an SSD (e.g., memory card) may include a non-volatile memory (NVM) and a controller. The NVM includes a first NVM portion and a second NVM portion. The first NVM portion includes a plurality of first cell types (e.g., plurality of single level cells (SLCs)). The first NVM portion includes a first sub-portion that is allocated to store file management data (e.g., File Allocation Table (FAT) data). The second NVM portion includes a plurality of second cell types (e.g., MLCs, TLCs). The controller is coupled to the NVM. The controller is configured to receive a plurality of payload data and a plurality of file management data; store the plurality of file management data at the first sub-portion of the first NVM portion; and store the plurality of payload data at the NVM.

As will be further described below, in some implementations, an SSD (e.g., memory card) that includes different portions and/or sub-portions for storing different types of data, allows the SSD to provide improved sustained writing speeds and/or a reduction in the amount of data loss. In some implementations, different types of data may be initially routed to different portions and/or sub-portions of the SSD. These different portions and/or sub-portions may be allocated to store only certain types of data. In addition, routing different types of data to different portions of the SSD may prevent garbage collection from being triggered during the writing of data by the SSD when a host is recording video. In some implementations, by avoiding garbage collection when the host may be recording video, the SSD is able to provide sustained high writing speeds that can at least match the speed at which a host is capturing video data, thus providing support for real time recording and storing of video data.

Figure 1:
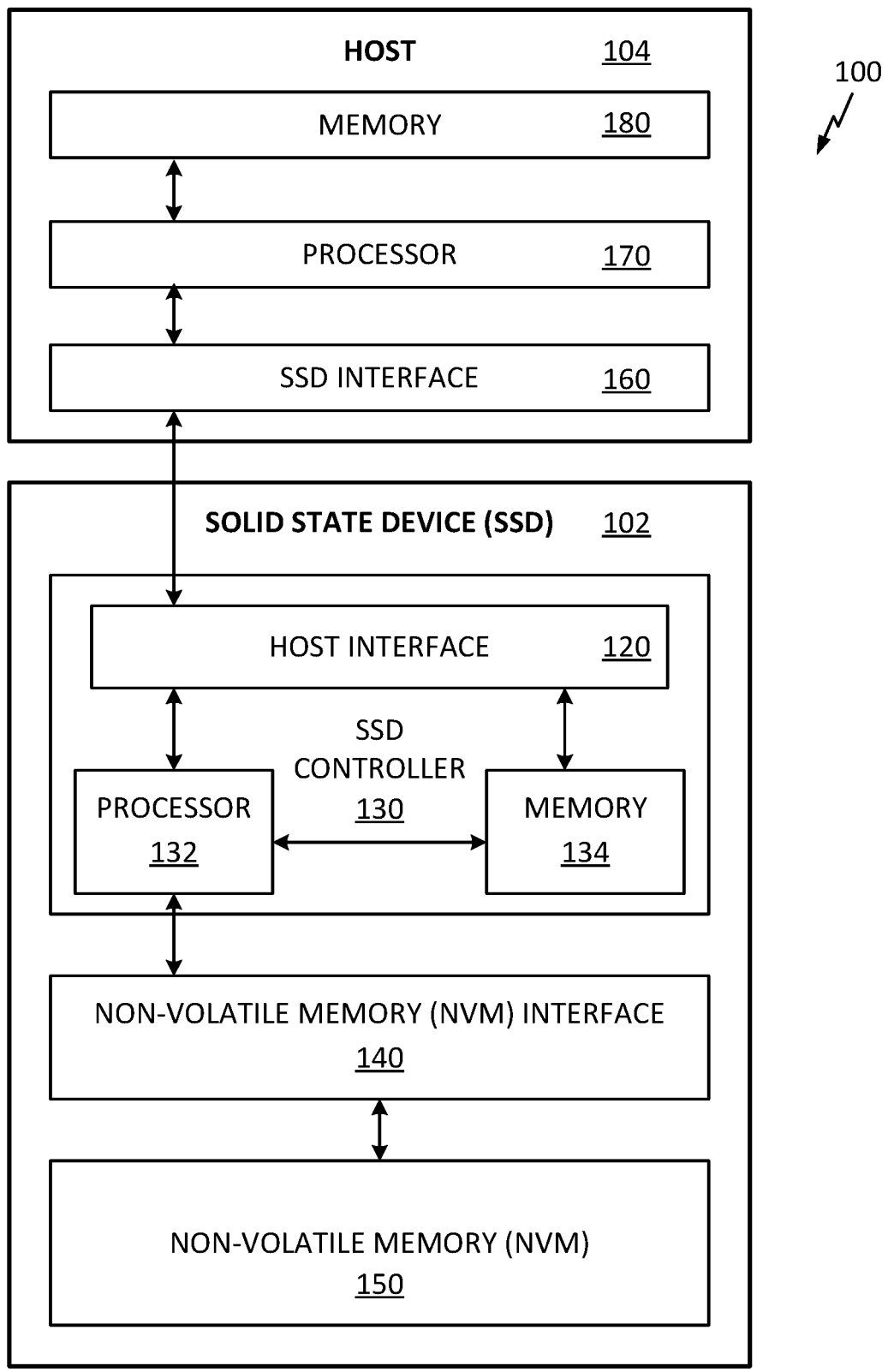
FIG. 1 illustrates a block diagram of a solid state device (SSD) in accordance with embodiments of the present disclosure.

FIG. 1 illustrates a block diagram of a device 100 that includes a solid state device (SSD). The device 100 includes a solid state device (SSD) 102 and a host 104. The SSD 102 may be an example of a data storage apparatus. In some implementations, the SSD 102 may be implemented as a memory card. In some implementations, the SSD 102 may be implemented as a solid state drive. The SSD 102 is coupled to the host 104. Commands and data that travels between the SSD 102 and the host 104 may be referred as I/O overhead.

The SSD 102 includes a controller 130, a non-volatile memory (NVM) interface 140 and a non-volatile memory (NVM) 150, such as NAND Flash memory. The controller 130 includes a host interface 120, a processor 132 (or alternatively, an NVM processor 132) and a memory 134 (e.g., random access memory (RAM)). In some implementations, the NVM interface 140 may be implemented within the controller 130. The host interface 120 may be implemented outside of the controller 130.

The controller 130 is configured to control the NVM 150 through the NVM interface 140. The controller 130 may be implemented in a System on Chip (SoC). The processor 132 may be a processor die, and the memory 134 may be a memory die. In some implementations, two or more of the above components (e.g., processor, memory) may be implemented as a single die.

The host interface 120 facilitates communication between the host 104 and other components of the SSD 102, such as the controller 130, the processor 132, and/or the memory 134. The host interface 120 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, Non Volatile Memory Express (NVMe), or the like. The host interface 120 of the SSD 102 may be in communication with the SSD interface 160 of the host 104.

The processor 132 is coupled to the RAM memory 134. The processor 132 is also coupled to the NVM 150 via the NVM interface 140. The processor 132 controls operation of the SSD 102. In various aspects, the processor 132 receives commands from the host 104 through the host interface 120 and performs the commands to transfer data between the host 104 and the NVM 150. Furthermore, the processor 132 may manage reading from and writing to the memory 134 for performing the various functions effected by the processor 132 and to maintain and manage cached information stored in memory 134. The processor 132 may receive data through a buffer (not shown) and/or send data through the buffer (not shown). The buffer may be part of the memory 134 or separate from the memory 134.

The processor 132 may include any type of processing device, such as a microprocessor, a microcontroller, an embedded controller, a logic circuit, software, firmware, or the like, for controlling operation of the SSD 102. In some aspects, some or all of the functions described herein as being performed by the processor 132 may instead be performed by another component of the SSD 102. For example, the SSD 102 may include a microprocessor, a microcontroller, an embedded controller, a logic circuit, software, firmware, or any kind of processing device, for performing one or more of the functions described herein as being performed by the processor 132. According to other aspects, one or more of the functions described herein as being performed by the processor 132 are instead performed by the host 104. In still further aspects, some or all of the functions described herein as being performed by the processor 132 may instead be performed by another component such as a processor in a hybrid drive including both non-volatile memory elements and magnetic storage elements.

The memory 134 may be any memory, computing device, or system capable of storing data. For example, the memory 134 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the processor 132 uses the memory 134, or a portion thereof, to store data during the transfer of data between the host 104 and the NVM 150. For example, the memory 134 or a portion of the memory 134 may be a cache memory. The memory 134 may be a shared memory that is accessible by different components, such the processor 132.

The NVM 150 receives data from the processor 132 via the NVM interface 140 and stores the data. The NVM 150 may be any type of non-volatile memory, such as a flash storage system, a NAND-type flash memory, a solid state storage device, a flash memory card, a secure digital (SD) card, a universal serial bus (USB) memory device, a CompactFlash card, a SmartMedia device, a flash storage array, or the like. In one aspect, where the NVM 150 includes a flash storage system, the NVM interface 140 may be a flash memory interface.

As will be further described below, the NVM 150 may include a first NVM portion and a second NVM portion. The second NVM portion may include a first sub-portion and a second sub-portion. The NVM 150 may include different cell types. Examples of cell types include a single level cell (SLC), a multi-level cell (MLC), and a triple level cell (TLC). These and other cell types are further described below.

The host 104 may be any device and/or system having a need for data storage or retrieval and a compatible interface for communicating with the SSD 102. For example, the host 104 may include a computing device, a personal computer, a portable computer, a workstation, a server, a router, a network device, a personal digital assistant, a digital camera, a digital phone, a digital video camera, or combinations thereof. The host 104 can include several hosts. The host 104 may be a separate (e.g., physically separate) device from the SSD 102. In some embodiments, the host 104 includes the SSD 102. For example, the SSD 102 may be a memory card that is inserted in the host 104. In other embodiments, the SSD 102 is remote with respect to the host 104 or is contained in a remote computing system communicatively coupled with the host 104. For example, the host 104 may communicate with the SSD 102 through a wireless communication link.

The host 104 may include an SSD interface 160, a processor 170, a memory 180 (e.g., random access memory (RAM)). The SSD interface 160 is coupled to the processor 170. The processor 170 is coupled to the memory 180.

The SSD interface 160 facilitates communication between the SSD 102 and other components of the host 104, such as the processor 170 and the memory 180. The host 104 provides commands to the SSD 102 for transferring data between the host 104 and the SSD 102. For example, the host 104 may provide a write command to the SSD 102 for writing data to the SSD 102, or a read command to the SSD 102 for reading data from the SSD 102. The SSD 102 may provide a response, to the write command or the read command, to the host 104.

The processor 170 may be similar to the processor 132. For example, the processor 170 may include any type of processing device, such as a microprocessor, a microcontroller, an embedded controller, a logic circuit, software, firmware, or the like, for controlling operation of the host 104. In some aspects, some or all of the functions described herein as being performed by the processor 170 may instead be performed by another component of the host 104. For example, the host 104 may include a microprocessor, a microcontroller, an embedded controller, a logic circuit, software, firmware, or any kind of processing device, for performing one or more of the functions described herein as being performed by the processor 170. According to other aspects, one or more of the functions described herein as being performed by the processor 170 are instead performed by the SSD 102. In still further aspects, some or all of the functions described herein as being performed by the processor 170 may instead be performed by another.

The memory 180 may be any memory, computing device, or system capable of storing data. For example, the memory 180 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the processor 170 uses the memory 180, or a portion thereof, to store data. For example, the memory 180 or a portion of the memory 180 may be a cache memory. The memory 180 may be a shared memory that is accessible by different components, such the processor 170.

Figure 2:
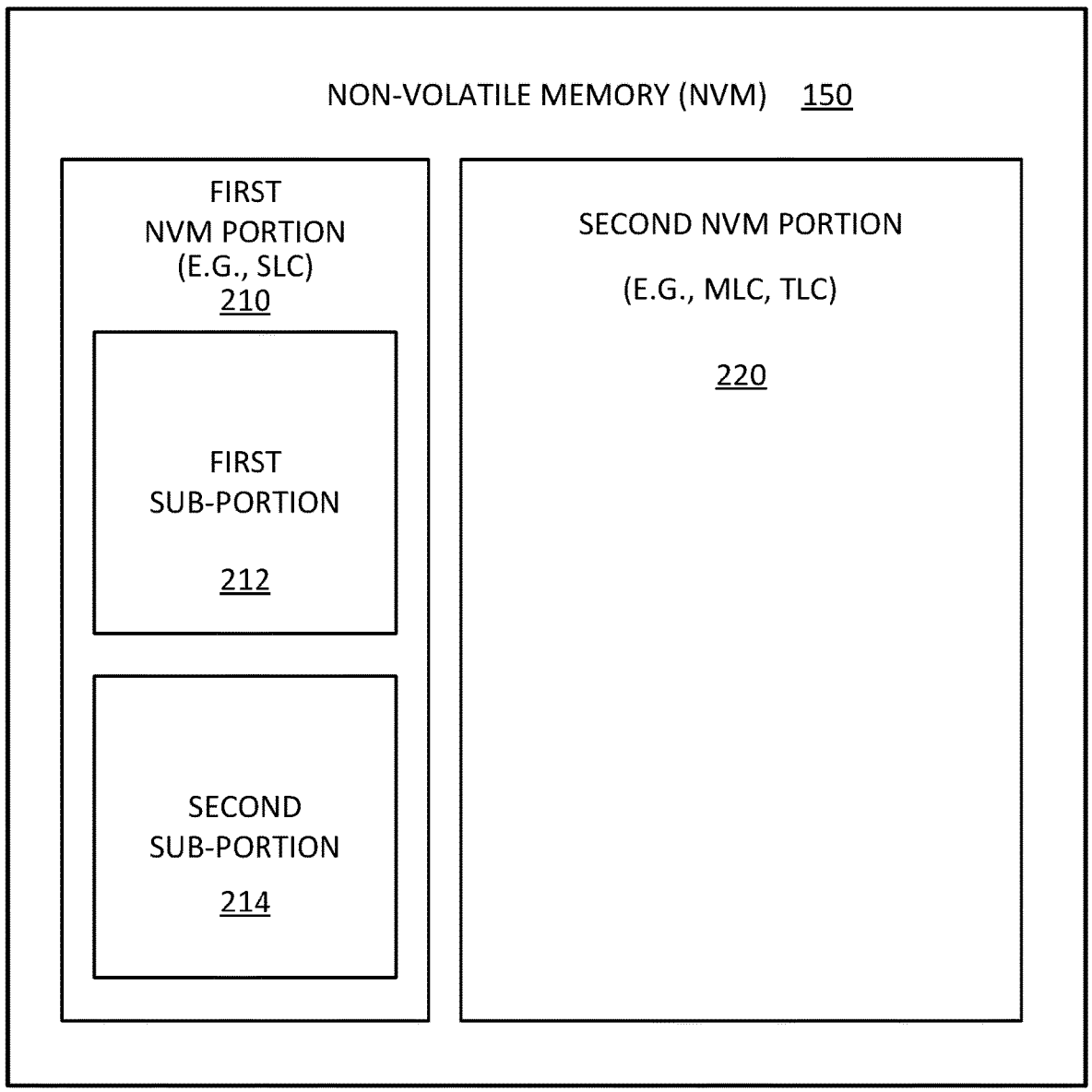
FIG. 2 illustrates a block diagram of a non-volatile memory (NVM) with several portions and sub-portions.

FIG. 2 illustrates a block diagram of the NVM 150. The NVM 150 includes a first NVM portion 210 and a second NVM portion 220. The first NVM portion 210 includes a first sub-portion 212 and a second sub-portion 214. The first NVM portion 210 may include one or more first dies (e.g., memory die), and the second NVM portion 220 may include one or more second dies (e.g., memory die). The first NVM portion 210 may be a first physical partition and/or a first logical partition of the NVM 150. The second NVM portion 220 may be a second physical partition and/or a second logical partition of the NVM 150. The first NVM portion 210 may include a plurality of single level cells (SLCs). The second NVM portion 220 may include a plurality of multi-level cells (MLCs). An MLC may include cells that are configured to 2 or more bits per cell. For example, the plurality of MLCs may include a plurality of triple level cells (TLCs). The first NVM portion 210 may include a plurality of first physical addresses (e.g., memory physical address), and the second NVM portion 220 may include a plurality of second physical addresses.

In some implementations, the first NVM portion 210 includes a first plurality of cells (e.g., memory cells) that has a first maximum writing speed, and the second NVM portion includes a second plurality of cells that has a second maximum writing speed that is lower than the first maximum writing speed. For example, the second plurality of cells may include MLCs and/or TLCs may have a second maximum writing speed that is lower than the first maximum writing speed of SLCs (which is an example of the first plurality of cells). In another example, the first plurality of cells may be MLCs and the second plurality of second cells may be TLCs, and the TLCs have a second maximum writing speed that is lower than the first maximum writing speed of the MLCs. In some implementations, the first plurality of cells and the second plurality of cells may be the same type of cells that have different maximum writing speeds. For example, the first plurality of cells may be a first plurality of SLCs with a first maximum writing speed, and the second plurality of cells may be a second plurality of SLCs with a second maximum writing speed.

The first NVM portion 210 includes a first sub-portion 212 and a second sub-portion 214. In some implementations, the first sub-portion 212 may include a subset of dies from the first dies of the first NVM portion 210. In some implementations, the first sub-portion 212 may be a physical partition and/or a logical partition of the first NVM portion 210. In some implementations, the first sub-portion 212 may include a first plurality of physical addresses from the first physical addresses of the first NVM portion 210. In some implementations, the second sub-portion 214 may include a subset of dies from the first dies of the first NVM portion 210. In some implementations, the second sub-portion 214 may be a physical partition and/or a logical partition of the first NVM 210. In some implementations, the second sub-portion 214 may include a second plurality of physical addresses from the first physical addresses of the first NVM portion 210.

FIG. 2 illustrates an example of how the NVM 150 may be divided into different portions and/or partitions. In some implementations, the first sub-portion 212 may be allocated to store (e.g., only store, initially store) file management data (e.g., File Allocation Table (FAT) data). In some implementations, the second sub-portion 214 may be allocated to store (e.g., only store, initially store) payload data (e.g., audio video data). In some implementations, the second NVM portion 220 may store file management data and/or payload data. However, the NVM 150 may have different configurations of portions and/or partitions, which may be reserved or allocated to store for different types of data. For example, the NVM 150 may include more than two NVM portions and/or more than two sub-portions.

In some implementations, different types of data may be stored (e.g., initially stored) in different portions of the NVM 150 to provide an SSD 102 that is capable of sustained high performance writing speeds. Moreover, storing different types of data in different portions may provide reduced data loss and/or reduced errors in data that is stored in the SSD 102.

Having described an SSD that includes several portions, schemes and methods for routing and storing different types of data to different portions of the SSD will now be described below.

Exemplary Routing Schemes for Writing to a Solid State Device (SSD)

Figure 3:
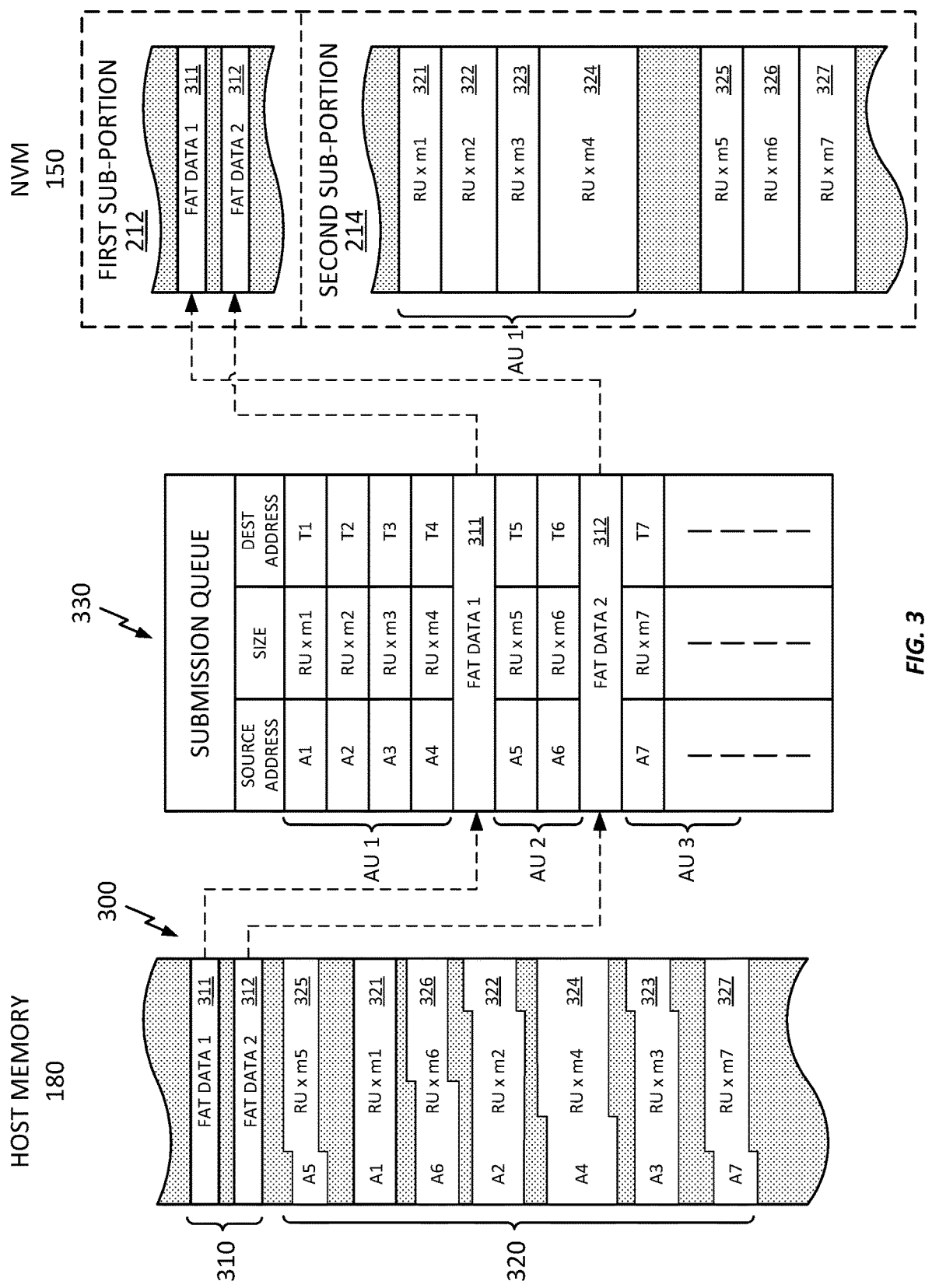
FIG. 3 illustrates a block diagram of different data being queued to be transmitted from a host to an SSD in accordance with embodiments of the present disclosure.

FIG. 3 illustrates a block diagram of how data may be stored in a host memory and then queue up to be transmitted to an SSD. FIG. 3 illustrates the memory 180 of a host 104 storing a plurality of data 300. The plurality of data 300 may include a plurality of File Allocation Table (FAT) data 310, such as a first FAT data 302 and a second FAT data 304. FAT data may include entry data, bitmap data and FAT information. The plurality of data 300 may also include a plurality of payload data 320, such as payload data 321-327. Examples of payload data include audio video data. FIG. 3 illustrates that the payload data are stored in recording units (RUs) in the memory 180, with each recoding unit having a physical address. An RU is how memory may be divided in the memory 180. The plurality of FAT data 310 and the plurality of payload data 320 may be stored in the memory 180 in any manner or order (e.g., random order, sequential order). However, in some implementations, the plurality of FAT data 310 may be stored in physical addresses that are near each other.

FIG. 3 also illustrates how the plurality of FAT data 310 and the plurality of payload data 320 may be queued up to be transmitted to the SSD 102. The submission queue 330 illustrates an exemplary order that the host 104 may use to transmit data to the SSD 204. In this case, the plurality of payload data 320 are grouped into several allocation units (AUs). This allows some data to be stored in the same physical address (e.g., physical memory address) or same block of physical addresses of the SSD 012. In this example, the AU 1 includes a group of payload data 321-324, and the AU 2 includes a group of payload data 325-326. The payload data 321-324 are transmitted, followed by the first FAT data 311, then the payload data 325-326, and then the second FAT data 312. It is noted that the order of transmission or reception of the payload data and the FAT data may vary and be different.

As the data is being received by the SSD 102, the SSD 102 may direct different types of data to be stored in different portions of the NVM 150. Thus, in some implementations, the data that is received is routed or directed to specific portions and/or sub-portions of the NVM 150, based on pre-defined routing schemes. FIG. 3 illustrates that the first FAT data 311 and the second FAT data are directed to be stored at the first sub-portion 212 of the first NVM portion 210. As mentioned above, the first sub-portion 212 may be allocated to store (e.g., store only) file management data. The payload data 321-327 are directed to be stored at the second sub-portion 214 of the first NVM portion 210. As mentioned above, the second sub-portion 214 may be allocated to store (e.g., store only) payload data.

The destination addresses, which are represented as T1, T2, etc., are logical addresses that may be specified by the host 104. A translation table (e.g., flash translation table (FTL)) may be used by the SSD 102 to convert the logical address into physical addresses of the NVM 150. An example of how a translation table may operate is further illustrated and described below in FIG. 4. FAT data may include a logical address specified by the host 104. In some implementations, the FAT data may use a pre-defined set of logical addresses for all FAT data. In instances where there is no logical address specified for the FAT data by the host 104, the SSD 102 may specify a physical address that is located in the first sub-portion 212. The SSD 102 may identify data received from the host 104 as being FAT data using various methods. In some implementations, data may be identified as FAT data based on the logical block addressing (LBA) and/or the command size (e.g., CMD size) of the data. For example, data that is associated with a particular pre-defined logical address may be considered FAT data. In one example, data that is below a certain threshold size may be considered FAT data. In one example, data that is associated with a certain command may be considered FAT data. In some implementations, the SSD 102 may use one or more of the above methods for determining whether data is FAT data. In some implementations, combinations of the above methods may be used to determine whether data is FAT data. However, it is noted that the SSD 102 may use other methods for determining that data is FAT data. In some implementations, when the SSD 102 determines that data is not FAT data, the SSD 102 may determine that the data is payload data.

As will be further described below, these routing schemes allow the SSD 102 to provide sustained high-performance writing speeds during a recording of video (e.g., high density (HD) video, 4K video) by the host 104. This enables high quality video to be recorded and stored in real time. Moreover, these routing schemes reduce the amount of data that is loss and/or errors in data.

Figure 4:
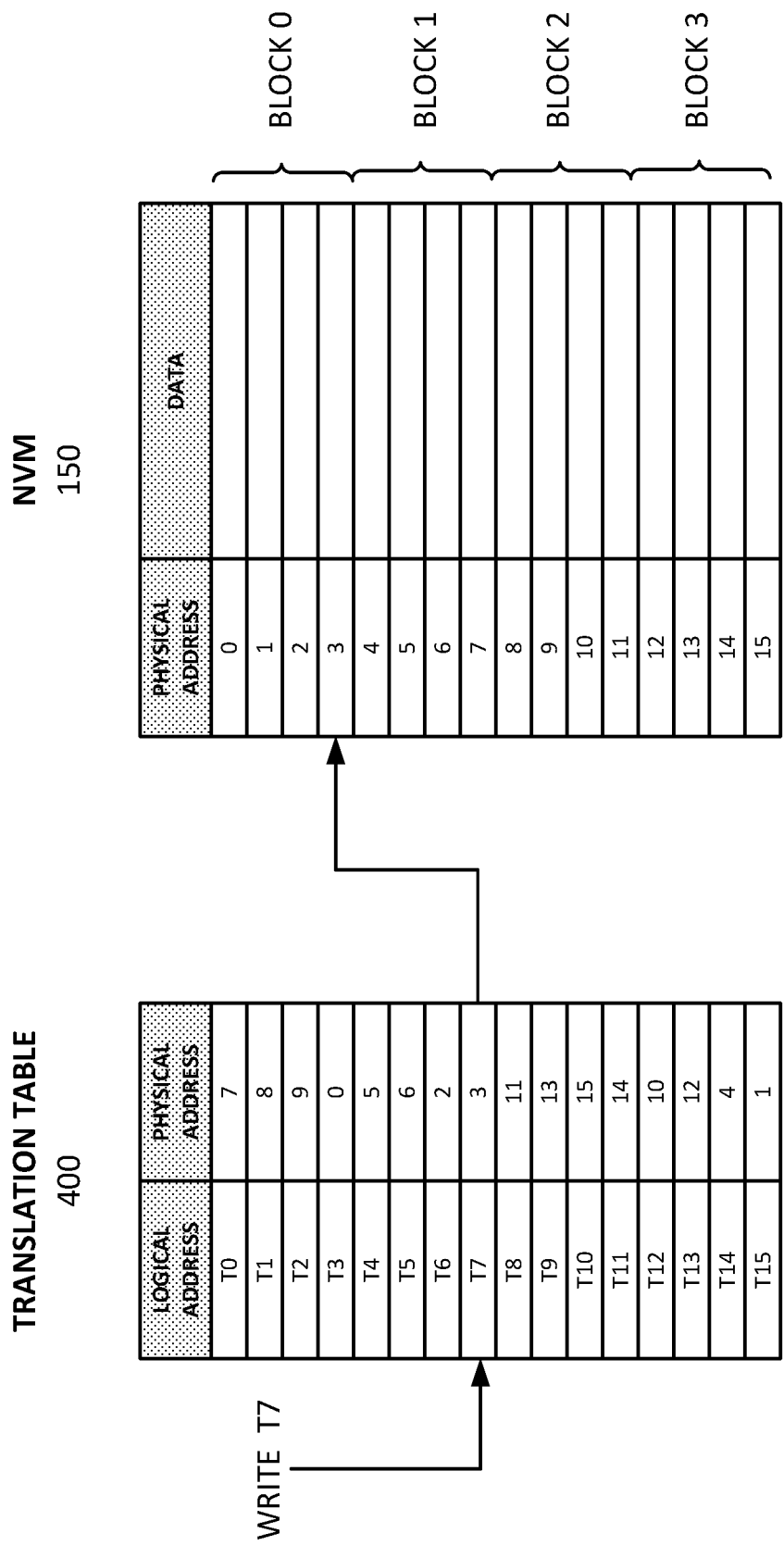
FIG. 4 illustrates a block diagram of a translation table in an SSD in accordance with embodiments of the present disclosure.

As mentioned above, the SSD 102 may use a translation table to determine where to store the different types of data. FIG. 4 illustrates an example of a translation table 400 that may be used to convert logical addresses to physical addresses. The translation table 400 may be a flash translation table (FTL).

The translation table 400 may include instructions and/or commands that convert a logical address to a physical address in the SSD 102. The translation table 400 may manage the NVM 150 in terms of blocks (e.g., memory blocks) for ease of management. Every block has a physical address which may be pre-determined or pre-defined in the NVM 150. The assignment of the logical address to the physical address may be done at flash management unit (FMU) level, which is generally 4K. The translation table 400 may assign the next available physical memory to the incoming logical address. Once the physical address is assigned to a logical address, the physical address is stored in the translation table 400. Whenever the data in a physical address X, is moved to a physical address Y, the translation table 400 is updated with the updated physical address for the logical address. Every I/O operation that requires a physical address for a user data may use the translation table 400.

FIG. 4 illustrates an example where there is a command to write to logical address T7. The command may be from the host 104. The logical address T7 is associated with the physical address 3 of the NVM 150. The physical address 3 is part of the block 0 (e.g., memory block) of the NVM 150. Thus, when the host 104 specifies that data be written to the logical address T7, the data is stored in the physical address 3 of block 0 of the NVM 150.

Figure 5:
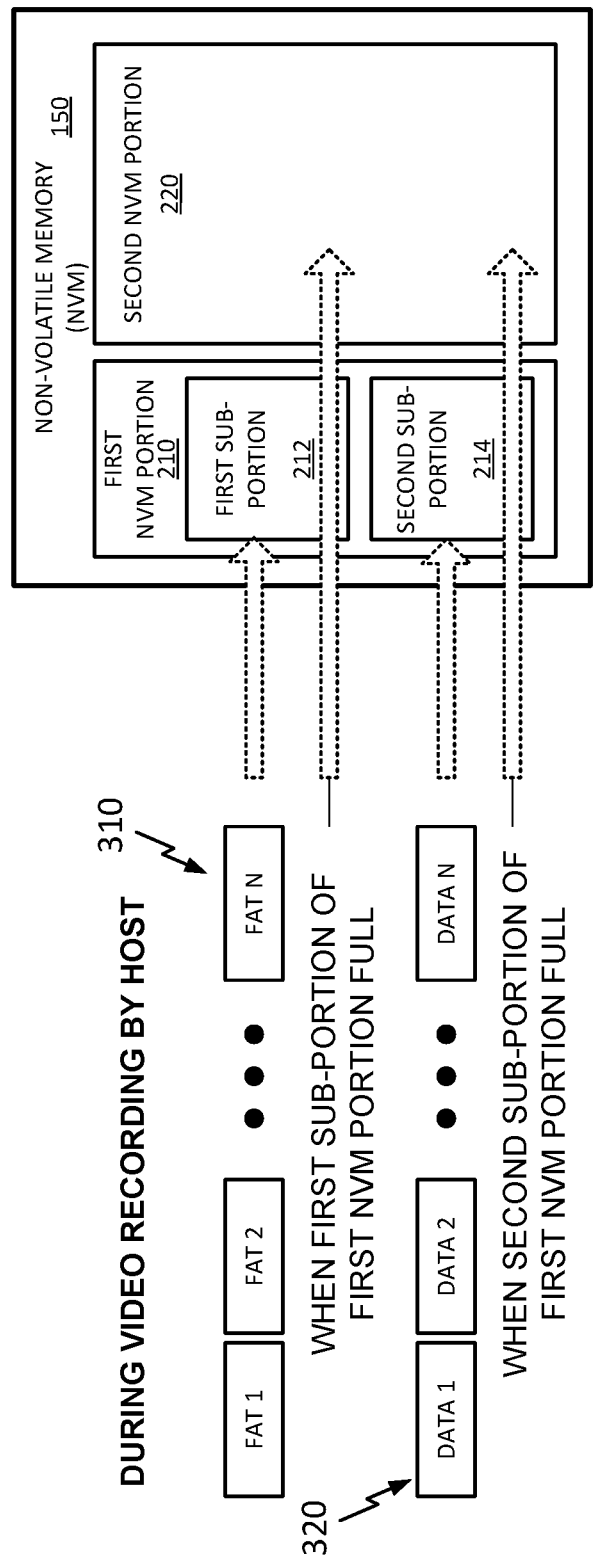
FIG. 5 illustrates a block diagram of different types of data being routed to different locations of an NVM of an SSD in accordance with embodiments of the present disclosure.

FIG. 5 illustrates a block diagram of how data may be stored in the NVM 150 during a recording of video by a host that is coupled to the SSD. As shown in FIG. 5, one or more FAT data from the plurality of FAT data 310 is directed by the SSD 102, to be stored (e.g., initially stored) at the first sub-portion 212 of the first NVM portion 210 of the NVM 150. However, if at any point, the first sub-portion 212 is full or there is not enough available space at the first sub-portion 212, the SSD 102 may direct one or more FAT data from the plurality of FAT data 310, to be stored at the second NVM portion 220. In some implementations, before storing data at the NVM 150, the SSD 102 may make a determination as to whether there is available space at the first sub-portion 212, to store FAT data. When there is available space (e.g., when the first sub-portion 212 is not full), the SSD 102 may store the FAT data at the first sub-portion 212. However, when there is not available space at the first sub-portion 212, the SSD 102 may store the FAT data at the second NVM portion 220. This process may be iteratively performed for each FAT data that is received by the SSD 102.

FIG. 5 also illustrates one or more payload data from the plurality of payload data 320 being directed by the SSD 102, to be stored (e.g., initially stored) at the second sub-portion 214 of the first NVM portion 210 of the NVM 150. However, if at any point or time, the second sub-portion 214 is full or there is not enough available space at the second sub-portion 214, the SSD 102 may direct one or more payload data from the plurality of payload data 320, to be stored at the second NVM portion 220. In some implementations, before storing data at the NVM 150, the SSD 102 may make a determination as to whether there is available space at the second sub-portion 214, to store payload data. When there is available space (e.g., when the second sub-portion 214 is not full), the SSD 102 may store the payload data at the second sub-portion 214. However, when there is not available space at the second sub-portion 213, the SSD 102 may store the payload data at the second NVM portion 220. This process may be iteratively performed for each payload data that is received by the SSD 102.

Thus, as shown in FIG. 5, in some implementations, the SSD 102 may first attempt to write payload data and/or FAT data (which is an example of file management data) at a portion (e.g., portion that includes SLCs) of the NVM 150 that has a first maximum writing speed before attempting to write data at another portion (e.g., portion that includes MLCs and/or TLCs) of the NVM 150 that has a second maximum writing speed that is lower than the first maximum writing speed.

FIG. 5 illustrates that the NVM 150 includes portions and sub-portions that are reserved or allocated for a particular type of data. Thus, in some implementations, particular physical addresses or blocks of physical addresses of the NVM 150 are reserved or allocated to store only a particular type of data. By limiting the type of data that can be stored at a particular location (e.g., physical address) of the NVM 150, and directing where data is stored during a video recording by the host, it reduces or eliminates the need by the SSD 102 to perform garbage collection during a video recording by the host. This enables the SSD 102 to provide sustained high performance writing speeds at the SSD 102, thus providing real time recording and storing of video data. When the SSD 102 is not capable of storing video data at the speed at which the host 104 is creating video data, then video data created by the host 104 will inadvertently be lost.

In some implementations, reserving and/or allocating physical addresses or blocks of physical addresses of the NVM 150 for storing only a particular type of data may be done during and/or after a formatting of the NVM 150. In some implementations, formatting or reformatting the NVM 150 may result in different physical addresses or blocks of physical addresses to be reserved and/or allocated to store a particular type of data.

In some implementations, the above technical advantage is achievable for the following reasons. One, the NVM 150 is divided into different portions, sub-portions, partitions (e.g., physical partition, logical partitions) or combinations thereof, where some of the portions and/or sub-portions may have different properties (e.g., storage capabilities per cell, writing speeds, reliability). Some of these different portions are made of different configurations of cells that store data. For example, the first NVM portion 210 may include SLCs, while the second NCM portion 220 may include MLCs and/or TLCs. An SLC is a memory cell that can store a single bit of data per cell. An SLC is faster than other cells at storing and retrieving data, is more reliable (e.g., less error prone) and longer lasting than other cells. However, an SLC is more expensive than other cells. An MLC is a memory cell that can store multiple bits of data per cell (e.g., two or more bits of data per cell). An MLC is not a fast as an SLC; is more error prone than an SLC, but an MLC is cheaper to fabricate than an SLC. An TLC is a memory cell that can store 3 bits of data per cell. An TLC cell is cheaper to fabricate than an SLC, but is not as reliable (e.g., more error prone) than an SLC. Since speed and reliability are important when initially storing information, the first NVM portion 210 includes a plurality of SLCs. Thus, when data is initially stored, a routing scheme will first attempt to store data at the first NVM portion 210, which is faster at storing data than the second NVM portion 220.

Second, the NVM 150 is divided in such a way that garbage collection may not be needed to be performed when writing to the NVM 150 during a video recording by the host 104. In some implementations, to account for a worst-case scenario, about 1 percent (%) or more of the total capacity of the NVM 150 is reserved for the first NVM portion 210. In some implementations, about 1 percent (%) or more of the total capacity of the NVM 150 is reserved for the first sub-portion 212 of the first NVM portion 210. In some implementations, saving about 1 percent or more of the total storage for storing FAT data is enough so that garbage collection is not triggered during video recording by the host 104. This is because in a worst-case scenario, FAT data will not be more than about 1 percent of the total audio video data.

Figures 6, 7:
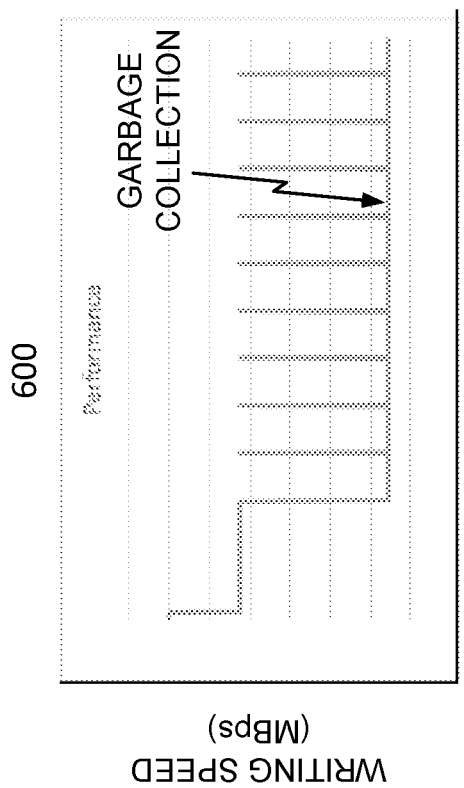
FIG. 6 illustrates a graph of an exemplary writing speed of an SSD in accordance with embodiments of the present disclosure.
FIG. 7 illustrates a graph of an exemplary writing speed of an SSD different routing schemes in accordance with embodiments of the present disclosure.

FIGS. 6 and 7 illustrates two graphs that show exemplary writing performance by an SSD under different scenarios. FIGS. 6 and 7 assume the SLCs have a maximum writing speed of about 1200 megabytes per second (MBps) and TLCs that have a maximum writing speed of about 850 MBps. These speeds are merely examples. Other SLCs, TLCs and MLCs may have different maximum writing speeds. FIG. 6 illustrates a graph 600 that shows writing speeds relative to how much data is stored in the NVM for an SSD that doesn't use a specialized routing scheme. As shown in FIG. 6, the SSD is able to sustain a high writing speed (e.g., about 850 MBps) for up to a particular amount of data stored in the SSD. After the particular amount of data is stored (e.g., about 110 GB of data stored in an SSD that has a capacity of about 512 GB) in the NVM, the high writing speed is no longer sustainable because the SSD has to perform garbage collection. This causes the writing speed to drop to around 110 MBps. Once the garbage collection is complete, the writing speed picks up again for a short period time, until the SSD has to perform garbage collection again. This process may repeat itself several times until the SSD is full. As shown in FIG. 6, the SSD is not able to sustain for a long period of time, high writing speeds.

The assumption in FIG. 6 is there is no pre-defined area for the FAT data. As such, the payload data and the FAT data are both directed to a common first type of cells (e.g., SLC), which leads to utilization of the first type of cells at a fast rate (in this case of FIG. 6 the mark is around 110 GB of user data for an SSD with storage of around 512 GB) which in turn leads to reaching the first type of cells threshold number of blocks. The first type of cells threshold is defined to have a minimum number of blocks to be always available in the SSD 102 to accept FAT data and/or data associated with Forced Unit Access (FUA) commands for faster turnaround time from the SSD 102. The minimum number of blocks may vary with different embodiments. When the first type of cells minimum threshold is reached, a garbage collection mechanism is triggered. This is a mechanism where the contents of first type of cells blocks are transferred to a second type of cells (e.g., TLC) blocks in order to free up the first type of cells blocks and maintain the first type of cells threshold. Since the first type of cells is common for all kinds of host data, this activity comes in the foreground which thereby directly impacts the SSD 102 performance to accept host data leading to performance dips as shown in FIG. 6. Foreground garbage collection may occur until the number of available blocks is returned back above the minimum number of blocks. FIG. 6 illustrates that after about 110 GB, the SSD 102 alternates between garbage collection and storage, which is highly inefficient. In addition, the first type of cells (e.g., SLCs) may have smaller block sizes than the block sizes for the second type of cells (e.g., TLCs). For example, SLCs may have block sizes of about 128 MB, while TLCs may have block sizes of about 384 MB. The smaller block sizes of the SLCs means that it is more likely that the minimum number of blocks available for FAT data and/or data associated with Forced Unit Access (FUA) commands will be reached, and thus more likely that garbage collection is triggered.

FIG. 7 illustrates a graph 700 that shows writing speeds relative to how much data is stored in the NVM for an SSD uses routing schemes. The NVM of FIG. 7 may use the same configuration of SLCs and TLCs as that of FIG. 6. The graph 700 shows that by routing certain types of data to certain locations, a high writing speed may be achieve even when the SSD is full or near capacity. The term full or full capacity of an SSD may mean when data can no longer be stored in the SSD. This specialized routing scheme avoids or reduces the triggering of garbage collection by the SSD (e.g., during a video recording by a host). In the example of FIG. 7, the SSD is able to sustain a high writing speed (e.g., about 850 MBps) while the SSD is being used to store data received from a host (e.g., video recording data from the host). In some implementations, the graph 700 illustrates writing speeds using some or all of the routing methods and schemes described in the present disclosure. FIG. 7 shows an initial writing speed of 1200 MBps, which may be attributed to the fact that data may be stored initially in the SLCs.

In FIG. 7, the routing of data is performed so that a certain type of data (e.g., FAT data) is stored in a first sub-portion 212 and another type of data (e.g., payload data) is first stored in a second sub-portion 214. This leads to efficient management of data from the host 104. When the other type of data (e.g., payload data) has used up all of the second sub-portion 214, subsequent other type of data (e.g., payload data) is routed to be stored in the second NVM portion 220. In implementations of the NVM 150, the partition or division of the NVM 150 is such, that even in a worse-case scenario, FAT data will always be stored in the first sub-portion 212. In some implementations, the first sub-portion 212 may represent about 1 percent of all the storage of the NVM 150, so that all of the FAT data and/or command can be stored in first sub-portion 212. The end result is that foreground garbage collection should be triggered during recording.

While the routing schemes described in the present disclose may not trigger garbage collection (e.g., foreground garbage collection) when the writing of data is performed during a video recording by the host 104, the SSD 102 may nonetheless perform garbage collection (e.g., background garbage collection) when the host 104 is idle (e.g., not video recording, not storing data at the SSD).

Figure 8:
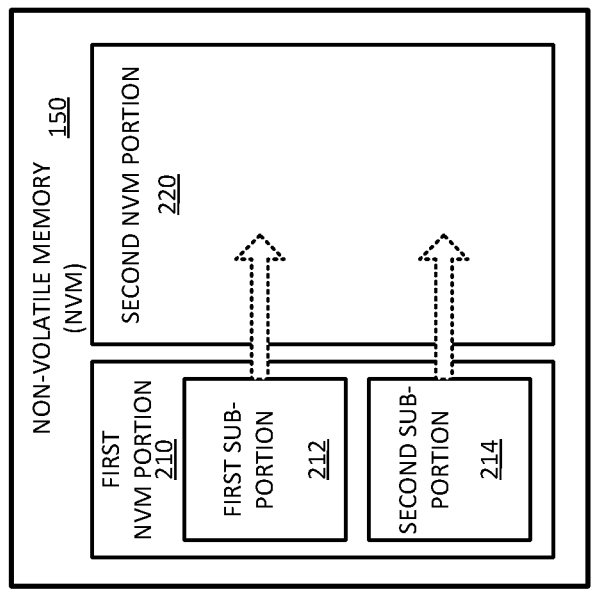
FIG. 8 illustrates a block diagram of garbage collection being performed on an NVM of an SSD in accordance with embodiments of the present disclosure.

FIG. 8 illustrates a block diagram of garbage collection (e.g., background garbage collection) being performed at the NVM 150, when the host 104 is idle (e.g., not performing video recording). As shown in FIG. 8, the SSD 102 may move or relocate data from the first sub-portion 212 to the second NVM portion 220; and/or move or relocate data from the second sub-portion 214 to the second NVM portion 220. In some implementations, data from a first location of the second NVM portion 220 may be moved or relocated to a second location of the second NVM portion 220. Moving or relocating data may include moving or relocating data a first physical address (e.g. physical memory address) to a second physical address. In some implementations, garbage collection may move data within the respective sub-portions. For example, garbage collection may include moving data at a first location of the first sub-portion 212 to a second location of the first sub-portion 212. Similarly, garbage collection may include moving data at a first location of the second sub-portion 214 to a second location of the second sub-portion 214. However, different implementations may perform garbage collection differently.

Figure 9:
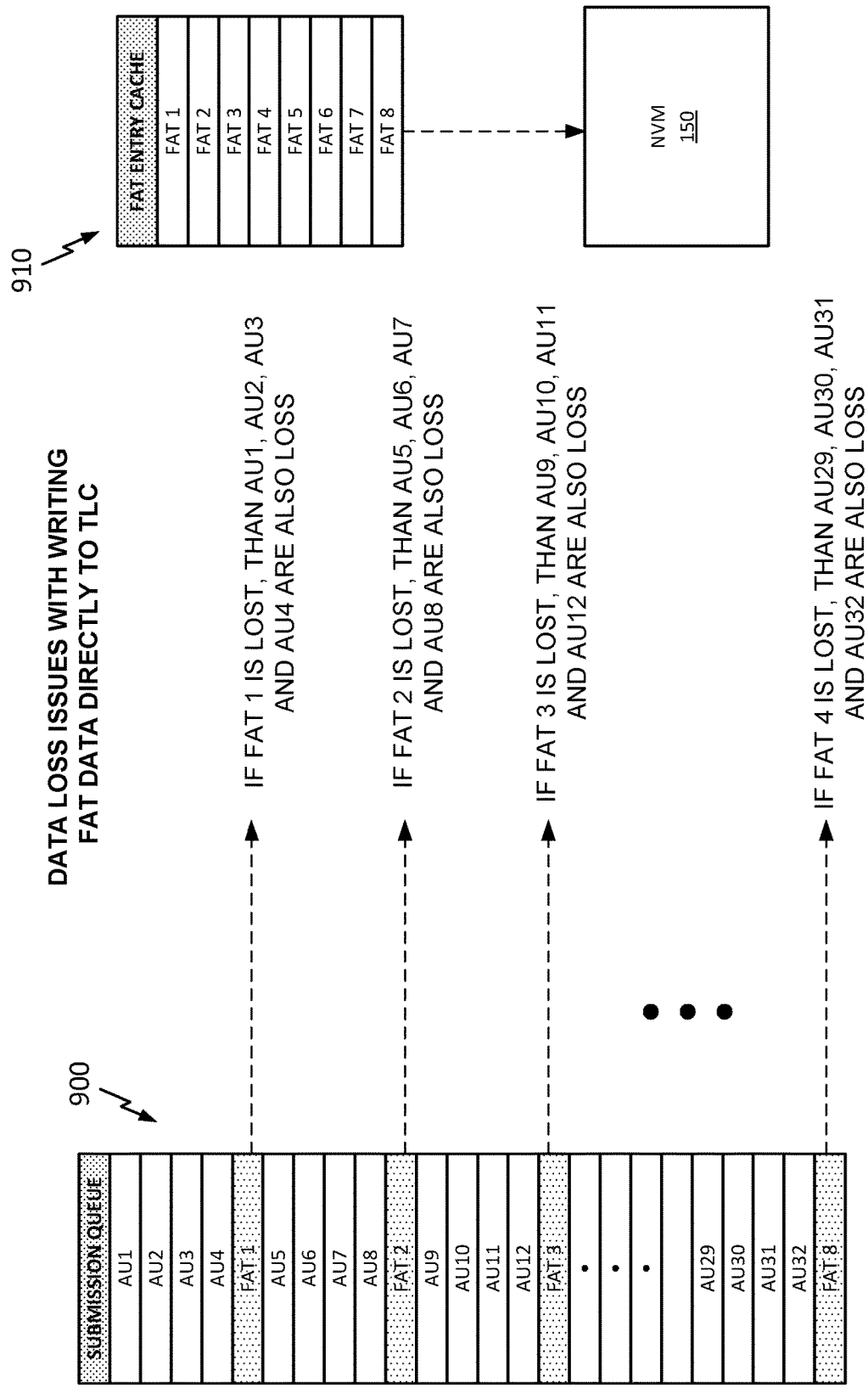
FIG. 9 illustrates a block diagram of a queue of different types of data to be transmitted from a host to an SSD in accordance with embodiments of the present disclosure.

Another technical advantage of the described routing scheme is the reduction in data loss. FIG. 9 illustrates how data is processed by the host 104 and the SSD 102, and how that may affect data loss and/or errors in data. FIG. 9 illustrates a submission queue 900 (may also me known as transmission queue) that includes a plurality of payload data and file management data (e.g., FAT data). The host 104 may queue up the data in such as way that data that are related to each other stay as close as possible in the submission queue or transmission queue.

FIG. 9 also illustrates a cache 910 (e.g., FAT entry cache) that is used to group FAT data together, so that they can be stored together in the same block of the NVM 150. In some implementations, the cache 910 maybe used by the SSD 102. FAT data, or any other file management data, does not usually take up a lot of space (relative to payload data), and to optimize space usage, FAT data may be grouped together for storage by the SSD 102. So as the host 104 is transmitting various types of data, FAT data is stored in a cache until there is enough FAT data (e.g., FAT data 1, FAT data 2, FAT data 3) to store in the NVM. However, payload data (e.g., AU 1, AU 2, AU 3) may not be stored in the NVM until the corresponding FAT data is also stored. In the event that a particular FAT data is loss or there is an error in the particular FAT data, then the corresponding payload data would also be lost. This can happen during ungraceful shutdown (UGSD) by the host 104 and/or the SSD 102. Thus, even though the SSD 102 may have properly received the payload data, if the corresponding FAT data is loss, then the corresponding payload data will also be considered loss.

The above issue can be reduced by storing the FAT data in a portion of the NVM 150 that includes SLCs, which are faster and more reliable than other memory cells, like MLCs and TLCs. Thus, by redirecting and routing FAT data to the first sub-portion 212, which includes a plurality of SLCs, the SSD 102 is reducing the likelihood of data loss and/or errors in data.

Having described various configurations of the NVM 150 and technical advantages of the configurations of the NVM 150 and the routing schemes, various methods for writing and storing data at the SSD 102 will now be described below.

Exemplary Flow Charts of Methods for Writing at a Solid State Device (SSD)

Figure 10:
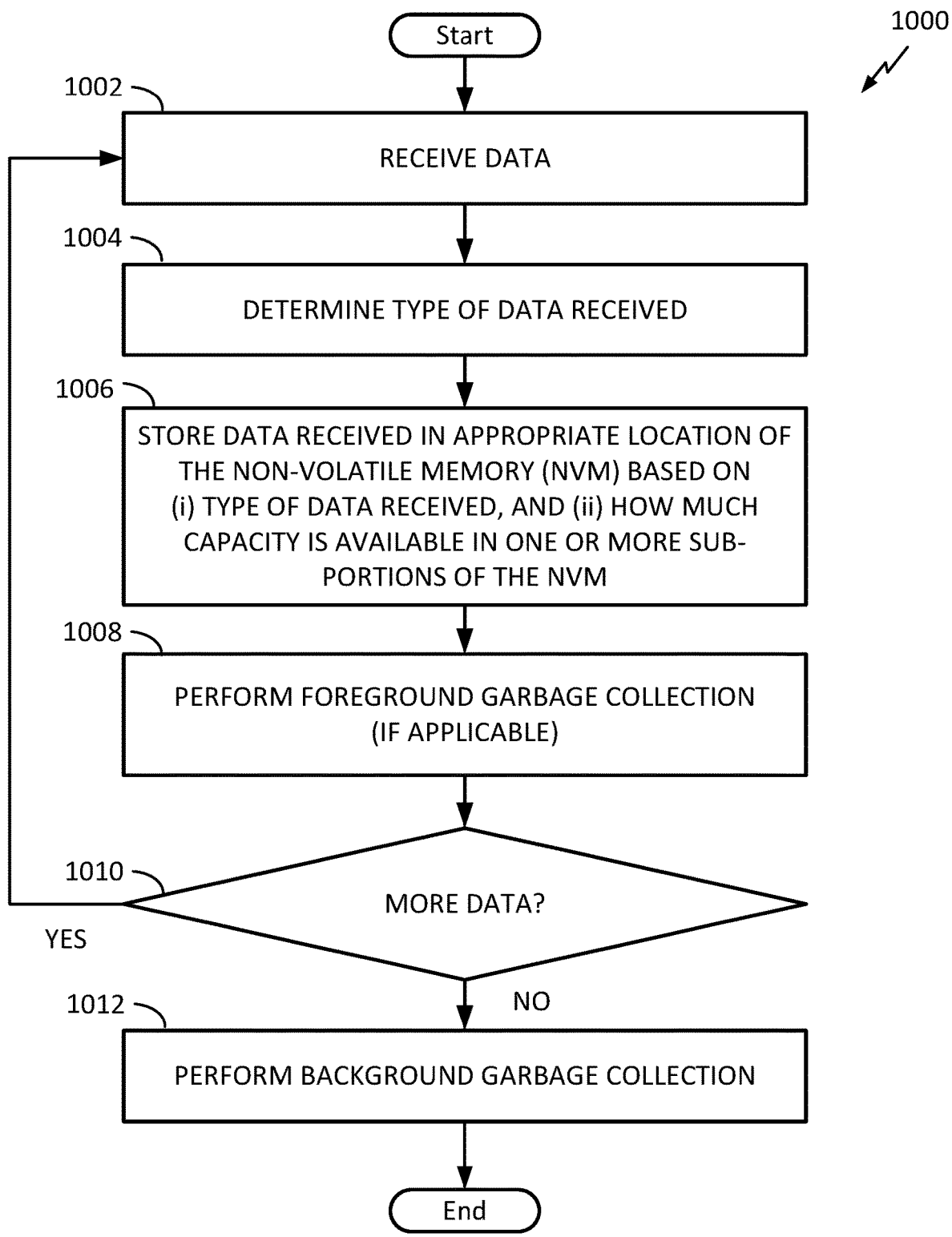
FIG. 10 illustrates an exemplary flow diagram of a method for writing to an SSD in accordance with embodiments of the present disclosure.

FIG. 10 illustrates a flow chart of a method 1000 for writing data at a solid state device (SSD). The method 1000 shown in FIG. 10 may be performed by any of the SSDs described in the present disclosure, such as the SSD 102. Also, for purpose of clarity, the method shown in FIG. 10 does not necessarily show all the operations performed by the SSD. In some implementations, the method shown in FIG. 10 may include other operations that can be performed by the SSD. In some implementations, the order of the methods may be changed or rearranged. The method 1000 may be performed by a controller or a processor of the SSD, as described above. Some parts or all of the method 1000 may be performed by the SSD 102, when the host 104 is recording video.

The method receives (at 1002) data. The data may be received from a host (e.g., 104) through the host interface 120. The data may include various types of data, such as file management data (e.g., FAT data) and audio video data.

The method determines (at 1004) the type of data that has been received. Data can include payload data (e.g., audio video data) and file management data, such FAT data. Data can also include data associated with a Force Unit Access (FUA) command and/or a read modify write (RMW) command. Different implementations may use different methods for determining the type of data that is received. For example, the SSD 102 may identify data received from the host 104 as being FAT data using various methods. In some implementations, data may be identified as FAT data based on the logical block addressing (LB A) and/or the command size (e.g., CMD size) of the data. For example, data that is associated with a particular pre-defined logical address may be considered FAT data. In one example, data that is below a certain threshold size may be considered FAT data. In one example, data that is associated with a certain command may be considered FAT data. In some implementations, the SSD 102 may use one or more of the above methods for determining whether data is FAT data. In some implementations, combinations of the above methods may be used to determine whether data is FAT data. However, it is noted that the SSD 102 may use other methods for determining that data is FAT data. For example, the method may determine that data is payload data or FAT data by looking at the header of the data and/or looking at the size of the data. The host 104 may specify the type of data that is transmitted to the SSD 102. In some implementations, when the SSD 102 determines that data is not FAT data, the SSD 102 may determine that the data is payload data.

The method stores (at 1006) the received data at an appropriate location based (i) on the type of data received and (ii) how much space or capacity is available at one or more of the portions and/or sub-portions of the NVM 150.

For example, when the received data is FAT data, the method 1000 may determine whether the first sub-portion 212 is full or if there is enough available space at the first sub-portion 212. When there is available space (e.g., when the first sub-portion 212 is not full), the method 1000 may store the FAT data at the first sub-portion 212. However, when the first sub-portion 212 is full or there is not enough available space at the first sub-portion 212, the method 1000 may direct the FAT data to be stored at the second NVM portion 220.

In another example, when the received data is payload data, the method 1000 may determine whether the second sub-portion 214 is full or if there is enough available space at the second sub-portion 214. When there is available space (e.g., when the second sub-portion 214 is not full), the method may store the payload data at the second sub-portion 214. However, when the second sub-portion 214 is full or there is not enough available space at the second sub-portion 214, the method 1000 may direct the payload data to be stored at the second NVM portion 220.

In yet another example, when the received data is associated with a FUA command or a RMW command, the method 1000 may determine whether the first sub-portion 212 is full or if there is enough available space at the first sub-portion 212. When there is available space (e.g., when the first sub-portion 212 is not full), the method 1000 may store the data associated with the FUA command or the RMW command at the first sub-portion 212. However, when the first sub-portion 212 is full or there is not enough available space at the first sub-portion 212, the method 1000 may direct the data associated with the FUA command or the RMW command to be stored at the second NVM portion 220.

In some implementations, the first sub-portion 212 and/or the second sub-portion 214 may be full or near capacity, and the method 1000 may perform (at 1008) a foreground garbage collection (e.g., garbage collection performed while host is recording video) to free up space in the first sub-portion 212 and/or the second sub-portion 214. For example, the method 1000 may perform foreground garbage collection when the data that is received is associated with the FUA command or the RMW command, and space (e.g., physical addresses) in the first sub-portion 212 that are allocated for storing data associated with the FUA command or the RMW command is full or near capacity.

The method determines (at 1010) whether there is more data. If so, the method proceeds back to receive (at 1002) more data. If not, the method 1000 may determine that the host is idle, and the method 1000 may perform (at 1012) a background garbage collection. As mentioned above, background garbage collection may occur when the host is idle (e.g., not recording video, not capturing image). Garbage collection may include moving or relocating data (e.g., FAT data, payload data) from a first physical address to a second physical address. The second physical address may be located within the same sub-portion or portion of the first physical address, or the second physical address can be located in a different sub-portion or different portion of the first physical address. Examples of garbage collections are described in FIG. 8.

Figure 11:
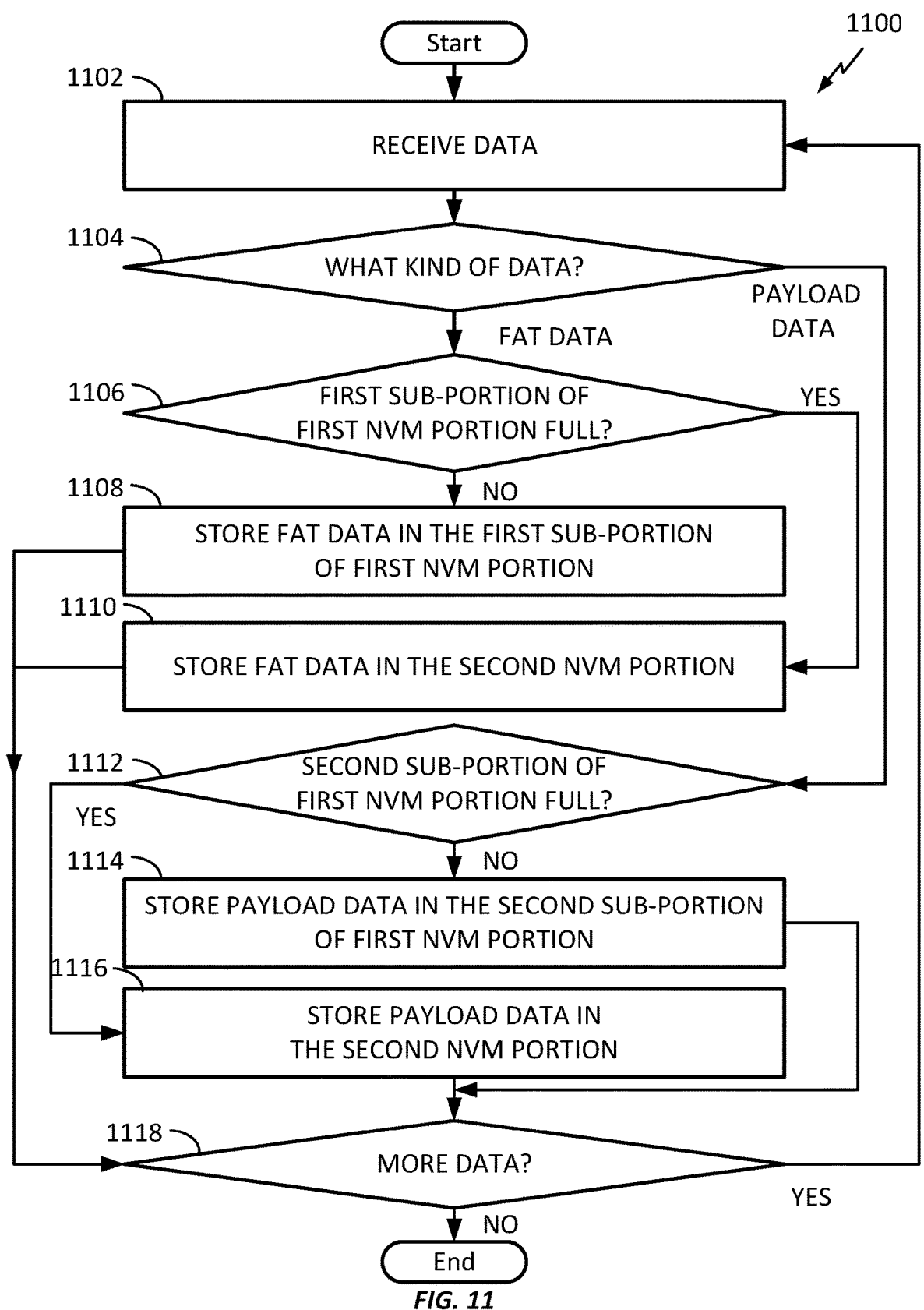
FIG. 11 illustrates an exemplary flow diagram of a method for routing different types of data to different portions of an NVM of an SSD in accordance with embodiments of the present disclosure.

FIG. 11 illustrates a flow chart of a method 1100 for writing data at a solid state device (SSD). The method shown in FIG. 11 may be performed by any of the SSDs described in the present disclosure, such as the SSD 102. Also, for purpose of clarity, the method shown in FIG. 11 does not necessarily show all the operations performed by the SSD. In some implementations, the method shown in FIG. 11 may include other operations that can be performed by the SSD. In some implementations, the order of the method may be changed or rearranged. The method 1100 may be performed by a controller or a processor of the SSD, as described above. Some parts or all of the method 1100 may be performed by the SSD 102, when the host 104 is recording video.

The method receives (at 1102) data. The data may be received from a host (e.g., 104) through the host interface 120.

The method determines (at 1104) the type of data that has been received. Data can include payload data (e.g., audio video data) and file management data, such as FAT data. Examples of how to determine the type of data are described in FIG. 10.

When the received data is file management data (e.g., FAT data), the method 1100 proceeds to determine (at 1106) whether the first sub-portion 212 is full or if there is enough available space at the first sub-portion 212. When there is available space (e.g., when the first sub-portion 212 is not full), the method 1100 stores (at 1108) the file management data at the first sub-portion 212, which may include storing data at one or more addresses from a first plurality of addresses of the first NVM portion 210. When the first sub-portion 212 is full or there is not enough available space at the first sub-portion 212, the method proceeds to store (at 1110) the file management data at the second NVM portion 220, which may include storing data at one or more addresses from a third plurality of addresses from the second NVM portion 220.

When the received data is payload data (e.g., audio video data), the method 1100 proceeds to determine (at 1112) whether the second sub-portion 214 is full or if there is enough available space at the second sub-portion 214. When there is available space (e.g., when the second sub-portion 214 is not full), the method 1100 stores (at 1114) the payload data at the second sub-portion 214, which may include storing data at one or more addresses from a second plurality of addresses of the first NVM portion 210. When the second sub-portion 214 is full or there is not enough available space at the second sub-portion 214, the method proceeds to store (at 1116) the payload data at the second NVM portion 220, which may include storing data at one or more addresses from a third plurality of addresses from the second NVM portion 220.

After storing (at 1108, 1110, 1114, 1116), the method 1100 determines (at 1118) whether there is more data. If so, the method proceeds back to receive (at 1102) more data. If not, the method 1100 may end or wait for more data.

Having described various configurations of an NVM and methods for routing different types of data to different portions of the NVM, a specific example of an SSD will now be described below.

Exemplary Solid State Device (SSD) with Partitions

Figure 12:
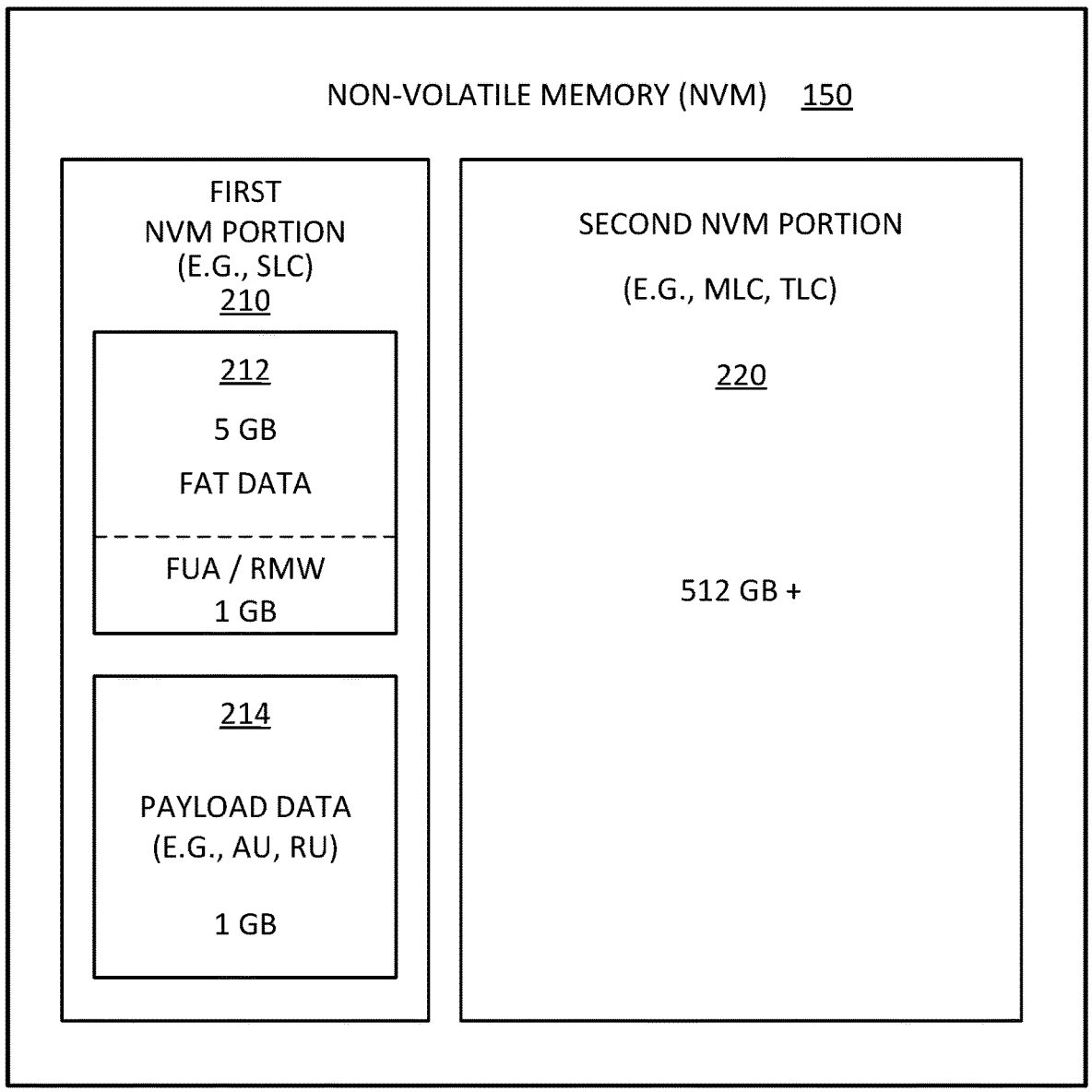
FIG. 12 illustrates a block diagram of an NVM with several portions and sub-portions.

FIG. 12 illustrates a block diagram of the NVM 150. The NVM 150 includes the first NVM portion 210 and the second NVM portion 220. The first NVM portion 210 includes the first sub-portion 212 and the second sub-portion 214. The first NVM portion 210 may include a plurality of single level cells (SLCs). The second NVM portion 220 may include a plurality of multi-level cells (MLCs). The plurality of MLCs may include a plurality of triple level cells (TLCs). The first NVM portion 210 may include a plurality of first physical addresses (e.g., memory physical address), and the second NVM portion 220 may include a plurality of second physical addresses. The first NVM portion 210 includes the first sub-portion 212 and the second sub-portion 214. In some implementations, the first sub-portion 212 may include a first plurality of physical addresses from the first physical addresses of the first NVM portion 210. In some implementations, the second sub-portion 214 may include a second plurality of physical addresses from the first physical addresses of the first NVM portion 210.

FIG. 12 illustrates an example of how the NVM 150 may be divided for a particular storage size. FIG. 12 illustrates that the second NVM portion has about 512 GB of storage space or more. The first sub-portion 212 has about 6 GB of storage of space. About 5 GB of the storage space of the first sub-portion 212 is allocated for storing (e.g., storing only) file management data (e.g., FAT data). In addition, about 1 GB of the storage space of the first sub-portion 212 is allocated for storing (e.g., only storing) special writing data (e.g., data associated with FUA command or RMW command). The second sub-portion 214 has about 1 GB of storage or more that is allocated for storing (e.g., storing only) payload data.

In some implementations, this allocation of storage space enables the SSD to provide a full card write of the SSD without having to perform garbage collection. In some implementations, this configuration assumes that the FAT data will not take up more than 1 percent of the payload data. Thus, if the SSD is capable of storing about 512 GB of data, then this configuration assumes that no more than about 5 GB is needed for the FAT data. However, different implementations may make different assumptions for the worst-case scenario and thus may utilize a different allocation of storage space for the SSD. FIG. 12 illustrates one example of how the NVM 150 may be partitioned and/or divided for a particular storage size. However, different implementations may use a NVM 150 with different storage sizes and/or different partitions and/or divisions.

Figure 13:
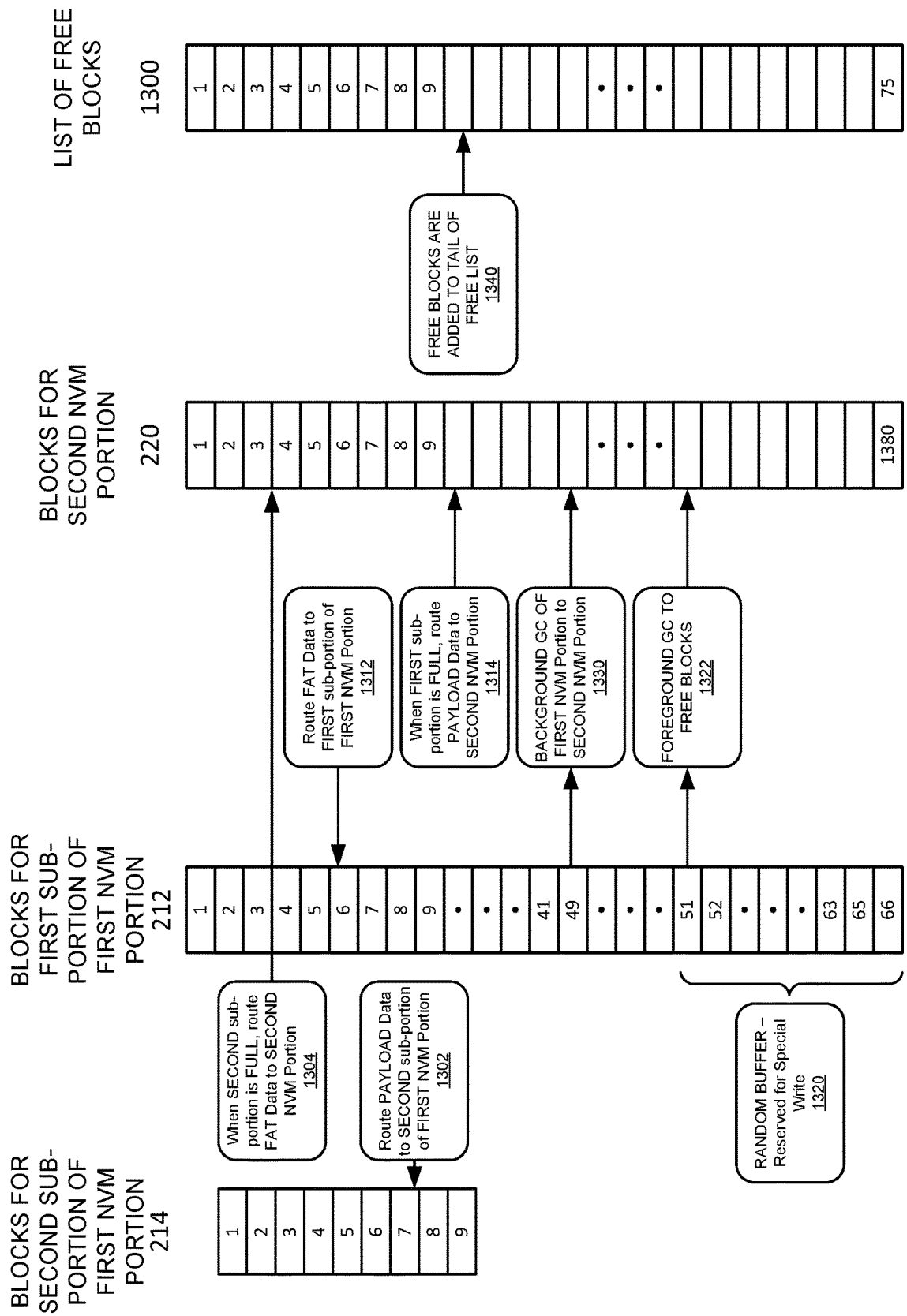
FIG. 13 illustrates a block diagram of blocks for different portions and sub-portions of an NVM of an SSD in accordance with embodiments of the present disclosure.

FIG. 13 illustrates a block diagram of different blocks for the SSD. Each block may represent pages and/or physical addresses of the NVM 150. The blocks may have different sizes (e.g., 128 MB). The blocks may be managed by a translation table (e.g., Flash Translation Table (FTL). In some implementation, the translation table is configured to convert a logical address of a particular data into a physical address at the NVM 150. Thus, the translation table may help route data towards a particular block (e.g., memory block) of the NVM 150. As mentioned above, the blocks of memory may be specified and allocated during and/or after a formatting of the NVM 150. In some implementations, reformatting the NVM 150 may result in different blocks (e.g., different physical addresses) being allocated and/or reserved for different data types.

FIG. 13 illustrates one or more payload data from the plurality of payload data 320 that are first stored (at 1302) at blocks at the second sub-portion 214 of the first NVM portion 210 of the NVM 150. In some implementations, 9 blocks (1-9) may be allocated for the second sub-portion 214. However, if at any point or time, the second sub-portion 214 is full or there is not enough available space at the second sub-portion 214, one or more payload data from the plurality of payload data 320 are stored (at 1304) at the second NVM portion 220.

FIG. 13 also illustrates that one or more FAT data from the plurality of FAT data 310 is stored (at 1312) at the first sub-portion 212 of the first NVM portion 210 of the NVM 150. In some implementations, 50 blocks (1-50) may be allocated for the second sub-portion 214. However, if at any point or time, the first sub-portion 212 is full or there is not enough available space at the first sub-portion 212, one or more FAT data from the plurality of FAT data 310, is stored (at 1314) at the second NVM portion 220.

FIG. 13 illustrates that about 17 blocks (51-66) of the first sub-portion 212 may be allocated as buffer for storing special write data, such as data associated with the FUA command and/or the RMW command. In some implementations, when there is no longer enough space for the data associated with the FUA command and/or RMW command, a foreground garbage collection may be performed (at 1322) to free up space for more data associated with the FUA command and/or the RMW command.

Background garbage collection may be performed (at 1330), when the host 104 is idle (e.g., not recording video) or when no data is received by the SSD 102. Background garbage collection may move or relocate data from blocks of the second sub-portion 214 and/or the first sub-portion 212 to blocks of the second NVM portion 220. In some implementations, when garbage collection is performed, blocks that are freed may be added (at 1340) to a list of free blocks 1300 that keeps tracks of which blocks are available to store data. Similarly, when blocks are freed (e.g., delete a file), the freed blocks may be added to the list of free blocks 1300. The list of free blocks 1300 helps the SSD 102 manage and determine where data can be stored. The list of free blocks 1300 may also help the SSD 102 ensure that one block is not storing data more often than other blocks.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. The term "about 'X'", or "approximately 'X'", as used in the disclosure shall mean within 10 percent of the 'value X'. For example, a value of about 1 or approximately 1, would mean a value in a range of 0.9-1.1.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A data storage apparatus comprising:
a non-volatile memory (NVM) comprising:
 a first NVM portion that includes a plurality of first cell types, wherein the first NVM portion comprises:
  a first sub-portion that is allocated to store file management data; and
  a second sub-portion that is allocated to store only payload data, wherein payload data does not include File Allocation Table (FAT) data; and
 a second NVM portion that includes a plurality of second cell types; and
a controller coupled to the NVM, the controller configured to:
 receive a plurality of payload data and a plurality of file management data;
 store the plurality of file management data at the first sub-portion of the first NVM portion; and
 store the plurality of payload data at the NVM.

2. The data storage apparatus of claim 1, wherein the first sub-portion is allocated to only store FAT data.

3. The data storage apparatus of claim 1, wherein storing the plurality of payload data at the NVM comprises storing the plurality of payload data at the second sub-portion of the first NVM.

4. The data storage apparatus of 3, wherein the controller is further configured to:
determine whether there is space available for storing data at the second sub-portion of the first NVM portion; and
store one or more payload data at the second NVM portion, when there is no space available for storing data at the second sub-portion of the first NVM portion.

5. The data storage apparatus of claim 1, wherein the controller is further configured to perform garbage collection at the first NVM portion.

6. The data storage apparatus of claim 1, wherein the file management data includes File Allocation Table (FAT) data.

7. The data storage apparatus of claim 1,
wherein the plurality of first cell types comprises a plurality of single-level cells (SLCs), and
wherein the plurality of second cell types comprises a plurality of multi-level cells (MLCs) and/or a plurality of triple level cells (TLCs).

8. The data storage apparatus of claim 1, wherein the data storage apparatus is a memory card.

9. The data storage apparatus of claim 1, wherein the first NVM portion includes a first die and the second NVM portions includes a second die.

10. A data storage apparatus comprising:
a non-volatile memory (NVM) comprising:
 a first NVM portion that includes a plurality of first cell types, wherein the first NVM portion comprises:
  a first sub-portion that is allocated to store file management data; and
  a second sub-portion that is allocated to store payload data,
 a second NVM portion that includes a plurality of second cell types; and
a controller coupled to the NVM, the controller configured to:
 receive a plurality of payload data and a plurality of file management data;
 store the plurality of file management data at the NVM, wherein storing the plurality of file management data comprises:
  determining whether there is space available for storing data at the first sub-portion of the first NVM portion;

storing one or more file management data at the first sub-portion of the first NVM portion, when there is space available for storing data at the first sub-portion of the first NVM portion; and storing one or more file management data at the second NVM portion, when there is no space available for storing data at the first sub-portion of the first NVM portion; and store the plurality of payload data at the NVM, wherein storing the plurality of payload data comprises:

determining whether there is space available for storing data at the second sub-portion of the first NVM portion;

storing one or more payload data at the second sub-portion of the first NVM portion, when there is space available for storing data at the second sub-portion of the first NVM portion; and storing one or more payload data at the second NVM portion, when there is no space available for storing data at the second sub-portion of the first NVM portion.

11. A method for operating a data storage apparatus, comprising:

receiving data, at a controller coupled to a non-volatile memory (NVM), wherein the NVM comprises:
a plurality of first cell types comprising:
a first plurality of addresses allocated to store only file management data; and
a second plurality of addresses allocated to store only payload data wherein payload data does not include File Allocation Table (FAT) data; and
a plurality of second cell types comprising a third plurality of addresses;
determining whether the received data includes payload data or file management data;
storing the received data at one or more addresses from the first plurality of addresses, when the received data includes file management data; and
storing the received data at one or more addresses from the second plurality of addresses, when the received data includes payload data.

12. The method of claim 11, wherein storing the received data at one or more addresses from the first plurality of addresses, when the received data includes file management data, comprises:

determining whether there is space available for storing data at the first plurality of addresses;

storing the received data at one or more addresses from the first plurality of addresses, when there is space available for storing data at the first plurality of addresses; and storing the received data at one or more addresses from the third plurality of addresses, when there is no space available for storing data at the first plurality of addresses.

13. The method of claim 11, further comprising:
determining whether the received data is associated with a Force Unit Access (FUA) command and/or a read modify write (RMW) command; and
storing the received data at one or more addresses from a fourth plurality of addresses of the plurality of first cell types, when the received data is associated with the FUA command and/or the RMW command.

14. The method of claim 13, storing the received data at one or more addresses from the fourth plurality of addresses, when the received data is associated with the FUA command and/or the RMW command, comprises storing the received data in a buffer of the plurality of first cell types.

15. A method for operating a data storage apparatus, comprising:

receiving data, at a controller coupled to a non-volatile memory (NVM), wherein the NVM comprises:
a plurality of first cell types comprising:
a first plurality of addresses allocated to store file management data; and
a second plurality of addresses allocated to store payload data; and
a plurality of second cell types comprising a third plurality of addresses;
determining whether the received data includes payload data or file management data;
storing the received data at one or more addresses from the first plurality of addresses, when the received data includes file management data, wherein storing the received data at one or more addresses from the first plurality of addresses, when the received data includes file management data, comprises:
determining whether there is space available for storing data at the first plurality of addresses;
storing the received data at one or more addresses from the first plurality of addresses, when there is space available for storing data at the first plurality of addresses; and
storing the received data at one or more addresses from the third plurality of addresses, when there is no space available for storing data at the first plurality of addresses; and
storing the received data at one or more addresses from the second plurality of addresses, when the received data includes payload data, wherein storing the received data at one or more addresses from the first plurality of addresses, when the received data includes payload data, comprises:
determining whether there is space available for storing data at the second plurality of addresses;
storing the received data at one or more addresses from the second plurality of addresses, when there is space available for storing data at the second plurality of addresses; and
storing the received data at one or more addresses from the third plurality of addresses, when there is no space available for storing data at the second plurality of addresses.

16. A data storage apparatus comprising:
means for non-volatile storing of data comprising:
means for first non-volatile storing of data, wherein the means for first non-volatile storing of data includes a plurality of first cell types, the means for first non-volatile storing of data, comprising:
a first plurality of addresses allocated to store file management data; and
a second plurality of addresses allocated to store only payload data, wherein payload data does not include File Allocation Table (FAT) data; and
means for second non-volatile storing of data, wherein the means for second non-volatile storing of data includes a plurality of second cell types, the means for second non-volatile storing of data, comprising a third plurality of addresses; and
means for controlling the means for non-volatile storing of data, wherein the means for controlling the means for non-volatile storing of data includes:

means for receiving data;

means for determining whether the received data includes payload data or file management data;

means for storing the received data at one or more addresses from the first plurality of addresses, when the received data includes file management data; and means for storing the received data at one or more addresses from the second plurality of addresses, when the received data includes payload data.

17. The data storage apparatus of claim 16, wherein the means for first non-volatile storing of data includes a plurality of single level cells (SLCs).

18. The data storage apparatus of claim 16, wherein the means for second non-volatile storing of data includes a plurality of multi-level cells (MLCs).

19. The data storage apparatus of claim 16, wherein the means for second non-volatile storing of data includes a plurality of triple-level cells (TLCs).

20. The data storage apparatus of claim 16, wherein means for controlling the means for non-volatile storing of data further includes:

means for determining whether there is space available for storing the received data at the second plurality of addresses;

means for storing the received data at the third plurality of addresses, when there is no space available for storing data at the second plurality of addresses and the received data includes payload data;

means for determining whether there is space available for storing the received data at the first plurality of addresses; and means for storing the received data at the third plurality of addresses, when there is no space available for storing data at the first plurality of addresses and the received data includes file management data.

* * * * *